United States Patent
Misawa

(10) Patent No.: US 8,971,647 B2
(45) Date of Patent: Mar. 3, 2015

(54) IMAGE COMPRESSION APPARATUS, IMAGE COMPRESSION METHOD, AND STORAGE MEDIUM

(71) Applicant: Canon Kabushiki Kaisha, Tokyo (JP)

(72) Inventor: Reiji Misawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 13/710,627

(22) Filed: Dec. 11, 2012

(65) Prior Publication Data
US 2013/0148886 A1    Jun. 13, 2013

(30) Foreign Application Priority Data
Dec. 13, 2011 (JP) ................. 2011-272157

(51) Int. Cl.
G06K 9/36 (2006.01)
G06K 9/46 (2006.01)
H04N 19/00 (2014.01)

(52) U.S. Cl.
CPC ........... *G06K 9/36* (2013.01); *G06K 9/4652* (2013.01); *H04N 19/00* (2013.01)
USPC .......................................................... 382/232

(58) Field of Classification Search
USPC .......... 382/162, 177, 232, 234, 237, 298, 299
See application file for complete search history.

(56) References Cited

U.S. PATENT DOCUMENTS

| | | | | |
|---|---|---|---|---|
| 7,133,565 B2 * | 11/2006 | Toda et al. | | 382/243 |
| 7,386,168 B2 * | 6/2008 | Misawa | | 382/166 |
| 7,715,624 B2 * | 5/2010 | Nishida | | 382/170 |
| 8,077,986 B2 * | 12/2011 | Tanaka | | 382/232 |
| 8,452,112 B2 * | 5/2013 | Kajiwara | | 382/243 |
| 2004/0165782 A1 * | 8/2004 | Misawa | | 382/239 |
| 2008/0019613 A1 * | 1/2008 | Tanaka | | 382/302 |

FOREIGN PATENT DOCUMENTS

JP    2004-260327 A    9/2004
JP    2005-012768 A    1/2005

\* cited by examiner

*Primary Examiner* — Phuoc Tran
(74) *Attorney, Agent, or Firm* — Canon U.S.A., Inc. IP Division

(57) ABSTRACT

An image compression apparatus determines a first reduction ratio according to an available memory capacity and reduces a multivalued image by the determined first reduction ratio to generate a first reduced multivalued image, and extracts a representative color of a character region from the first reduced multivalued image. The image compression apparatus reduces the first reduced multivalued image to generate a second reduced multivalued image, and compresses the second reduced multivalued image to generate a first compressed code. The image compression apparatus compresses a partial binary image corresponding to the character region to generate a second compressed code. Then, the image compression apparatus outputs compressed data including the first compressed code, the second compressed code, positional information about the character region, and information about the representative color of the character region.

18 Claims, 12 Drawing Sheets

FIG. 5A

EXAMPLE OF SETTING SCREEN ACCORDING
TO FIRST EXEMPLARY EMBODIMENT

SELECT RESOLUTION OF BACKGROUND.

- 150dpi
- 100dpi
- 50dpi
- 25dpi

FIG. 5B

EXAMPLE OF SETTING SCREEN ACCORDING
TO SECOND EXEMPLARY EMBODIMENT

SELECT IMAGE QUALITY
AND FILE SIZE.

- HIGHEST IMAGE QUALITY
- IMAGE QUALITY PRIORITY
- SIZE PRIORITY
- AUTO

FIG. 6

| MEMORY CAPACITY | REDUCTION RATIO IN FIRST REDUCTION UNIT |
|---|---|
| 24 M bytes OR MORE | 100% |
| 6M bytes OR MORE AND LESS THAN 24 M bytes | 50% |

FIG. 7
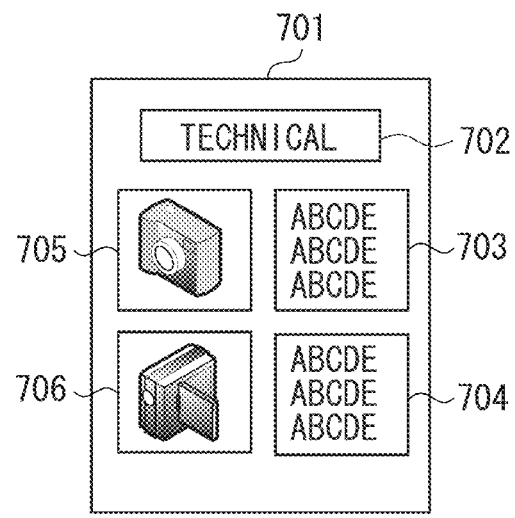
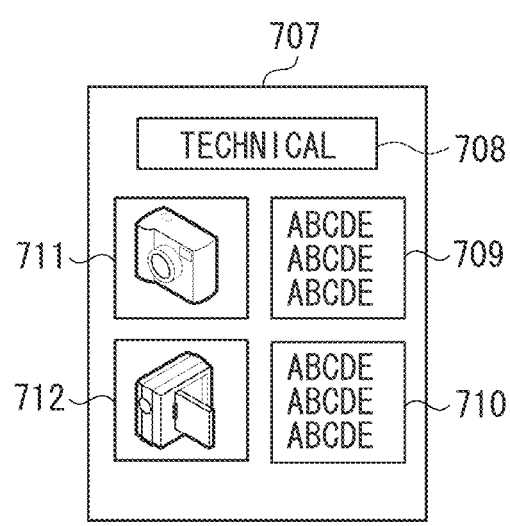

FIG. 10

| RESOLUTION OF BACKGROUND | REDUCTION RATIO IN FIRST REDUCTION UNIT | REDUCTION RATIO IN SECOND REDUCTION UNIT |
|---|---|---|
| 150 dpi | 100% | 50% |
| 100 dpi | 100% | 33% |
| 50 dpi | 100% | 17% |
| 25 dpi | 100% | 8% |
| 150 dpi | 50% | 100% |
| 100 dpi | 50% | 66% |
| 50 dpi | 50% | 33% |
| 25 dpi | 50% | 17% |

FIG. 11

| PROPORTION OF PHOTO REGION | REDUCTION RATIO IN FIRST REDUCTION UNIT | REDUCTION RATIO IN SECOND REDUCTION UNIT |
|---|---|---|
| 0% | 50% | 17% |
| 1~20% | 50% | 100% |
| 20~50% | 50% | 66% |
| 50~80% | 50% | 33% |
| 80~100% | 50% | 17% |

IMAGE COMPRESSION APPARATUS, IMAGE COMPRESSION METHOD, AND STORAGE MEDIUM

BACKGROUND OF THE INVENTION

1. Field of the Invention

The present invention relates to an image compression technique that compresses an input multivalued image.

2. Description of the Related Art

In recent years, electronic processing of a paper document has been advanced with the widespread scanners. In general, a color image has a large file size. Therefore, a method for compressing an image by Joint Photographic Experts Group (JPEG) compression is currently widespread. Although the JPEG compression is greatly effective to compress a natural image such as a photo, image deterioration referred to as "mosquito noise" occurs in a character portion with the JPEG compression. Hence, methods are proposed as described in Japanese Patent Application Laid-Open Nos. 2004-260327 and 2005-012768. With such methods, an input image is divided into three regions, which are a character region, a photo region, and a background region. Further, the character region is binarized, and is then compressed by a modified modified read (MMR) method, and the background region is compressed by the JPEG method, thereby expressing a full color image with a smaller file size while keeping the quality of the character region.

In order to further reduce the file size as compared with the compression methods discussed in Japanese Patent Application Laid-Open Nos. 2004-260327 and 2005-012768, there may be a method to significantly reduce the size of the background region. For example, if the input image has 300 dpi, the file size can be greatly reduced by reducing the background region to 50 dpi or 25 dpi. If contents of the background region are not so important, it is advantageous to greatly reduce a resolution of the background region (e.g., 25 dpi). However, as discussed in Japanese Patent Application Laid-Open No. 2004-260327, if the resolution of the input image is significantly reduced before extracting a representative color of a character, the representative color is extracted using a reduced multivalued image with 50 dpi or 25 dpi, and thus a problem is caused that the representative color of the character cannot be properly extracted. The representative color of the character is not properly extracted because colors of a matrix having 12×12 pixels in an input image having 300 dpi are combined to those of one pixel in a reduced multivalued image having 25 dpi, and the character color is mixed with another background color. That is, if the colors with 12×12 pixels contain a plurality of colors, the colors are combined to one, which leads to a substantial lack of color information.

As discussed in Japanese Patent Application Laid-Open No. 2005-012768, when the image is reduced in resolution just before the JPEG compression, the representative colors of characters can be properly obtained with a color multivalued image therebefore. However, in processing for extracting the representative colors, a large memory capacity is required to temporarily store the color multivalued image before reducing the image in resolution. In the case of a color multivalued image with 300 dpi and 24-bit red-green-blue (RGB), 24 M bytes are required as a memory capacity. Therefore, the processing is not realized in an image compression apparatus with a low memory capacity. To increase the memory capacity, a problem is caused that costs of hardware seriously rise.

SUMMARY OF THE INVENTION

According to an aspect of the present invention, an image compression apparatus includes a binarization unit configured to binarize a multivalued image to generate a binary image, a region specifying unit configured to specify a character region in the binary image binarized by the binarization unit, a first reduction unit configured to determine a first reduction ratio according to an available memory capacity and to reduce the multivalued image by the determined first reduction ratio to generate a first reduced multivalued image, a representative color extraction unit configured to extract a representative color of the character region based on the character region specified by the region specifying unit and the first reduced multivalued image generated by the first reduction unit, a second reduction unit configured to reduce the first reduced multivalued image to generate a second reduced multivalued image, a first compression unit configured to compress the second reduced multivalued image generated by the second reduction unit to generate a first compressed code, a second compression unit configured to compress a partial binary image corresponding to the character region specified by the region specifying unit to generate a second compressed code, and an output unit configured to output compressed data including the first compressed code generated by the first compression unit, the second compressed code generated by the second compression unit, positional information about the character region specified by the region specifying unit, and information about the representative color of the character region extracted by the representative color extraction unit.

According to exemplary embodiments of the present invention, a first reduction ratio is determined according to an available memory capacity. Further, a representative color is extracted based on a first reduced image obtained by performing a first reduction of an input multivalued image by the determined first reduction ratio. Then, a second reduced image obtained by performing a second reduction is compressed. As a consequence, the file size is greatly reduced while keeping extraction accuracy of the representative color according to the available memory capacity. Further, this can be realized in an image compression apparatus with a limited memory capacity.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5A illustrates an example of a setting screen displayed on an operation unit according to the first exemplary embodiment, and FIG. 5B illustrates an example of another setting screen displayed on the operation unit according to a second exemplary embodiment of the present invention.

FIG. 6 illustrates a relation between a memory capacity and a reduction ratio of a first reduction unit according to the first exemplary embodiment.

FIG. 7 illustrates an example of an input image according to the first exemplary embodiment.

FIG. 10 illustrates a relation between a set resolution of a background, the reduction ratio of the first reduction unit, and a reduction ratio of a second reduction unit according to the first exemplary embodiment.

FIG. 11 illustrates a relation between a proportion of a photo region and the reduction ratio of the second reduction unit according to the second exemplary embodiment.

DESCRIPTION OF THE EMBODIMENTS

Various exemplary embodiments, features, and aspects of the invention will be described in detail below with reference to the drawings.

Relative arrangements of components provided in an image compression apparatus and an image decompression apparatus, and expressions and numerical values used for processing operations, which will be described below according to exemplary embodiments of the present invention, are not intended to limit the scope of the present invention unless otherwise described.

Figure 1:
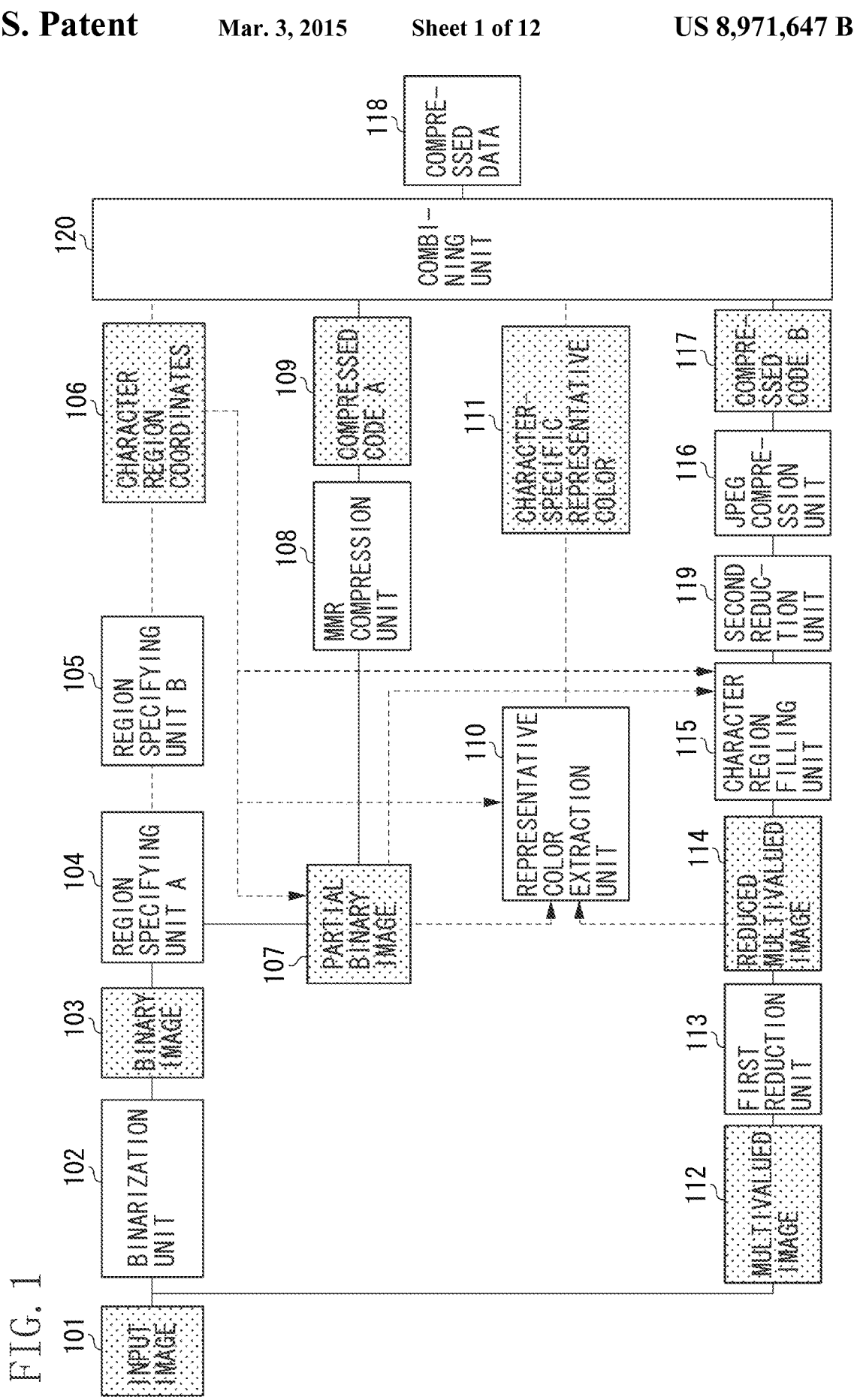
FIG. 1 illustrates a schematic configuration of an image compression apparatus according to a first exemplary embodiment of the present invention.

FIG. 1 illustrates a schematic configuration of an image compression apparatus according to a first exemplary embodiment of the present invention. Referring to FIG. 1, a solid line indicates an image flow and an input and a dotted line indicates an information flow and an input. An input image 101 is a color multivalued image with 300 dpi/24-bit RGB according to the present exemplary embodiment. A binarization unit 102 binarizes the input image 101, and generates a binary image 103. A region specifying unit A 104 receives the binary image 103, detects a character region by tracing a contour line or performing labeling processing of a pixel (e.g., black pixel) with a predetermined value, and thus generates a character region coordinate 106. The character region coordinate 106 includes information indicating a position (coordinate) or a size of the character region. The region specifying unit A 104 specifies the character region, and accordingly specifies a position or a size of a natural image region indicating a natural (gradation) image such as a photo or an illustration other than the character region. Further, the region specifying unit A 104 separately generates attribute information (a character or an image) to specify the type of region. With a conventional technique, an attribute of a character or an image can be identified based on the size, position, or pixel density of a connected black pixel. A region specifying unit B 105 receives the binary image 103 and the character region coordinate 106 generated by the region specifying unit A 104, and specifies the position and the size of each of characters in the character region (in a unit-character region). For a brief description, information about the position and the size of the unit-character region is added to the character region coordinate 106 according to the present exemplary embodiment. A binary image for each character region (a partial binary image 107) is generated with the character region coordinate 106 generated by the region specifying unit A 104.

A first reduction unit 113 reduces a multivalued image 112 (reduction in resolution), and generates a reduced multivalued image 114 (first reduced multivalued image). The reduction ratio of the first reduction unit 113 is determined based on a memory capacity of a random access memory (RAM) 206 available for storing the reduced multivalued image 114. Details of the reduction ratio of the first reduction unit 113 are described below. The multivalued image 112 is identical to the input image 101.

A representative color extraction unit 110 receives and refers to the partial binary image 107, the character region coordinate 106, and the reduced multivalued image 114, and calculates a character-specific representative color 111 of the unit-character region in the character region with a positional correspondence between a black portion of the partial binary image 107 and the reduced multivalued image 114.

A character region filling unit 115 receives and refers to the partial binary image 107, the reduced multivalued image 114, and the character region coordinate 106, and performs processing for filling each character region or unit-character region of the reduced multivalued image 114 with a surrounding color. That is, the character region filling unit 115 performs the filling processing of the character portion in the reduced multivalued image 114 by replacing a pixel value of the character with the surrounding color (surrounding background color).

A second reduction unit 119 performs second reduction processing of the reduced multivalued image after filling the character region with a surrounding color thereof by the character region filling unit 115, thereby generating a second reduced multivalued image. The reduction ratio of the second reduction unit 119 is determined based on information selected on a screen displayed on an operation unit 203. Details of the reduction ratio of the second reduction unit 119 are described later.

A JPEG compression unit 116 performs the JPEG compression of the filled and reduced multivalued image (second reduced multivalued image), which has undergone the filling processing by the character region filling unit 115 and the reduction processing by the second reduction unit 119, and generates a compressed code B 117 (first compressed code).

An MMR compression unit 108 compresses the partial binary images 107 by the MMR method, and generates a compressed code A 109 (second compressed code). In place of the MMR compression unit 108, binary image compression methods other than the MME compression can be used, e.g., Joint Bi-level Image Experts Group (JBIG) compression, modified read (MR) compression, or modified Huffman (MH) compression.

A combining unit 120 combines data of the character region coordinate 106, the compressed code A 109, the character-specific representative color 111, and the compressed code B 117, and outputs compressed data 118. The compressed data 118 may further be lossless-compressed to a portable document format (PDF).

If the input image 101 does not include the character region, the compressed data 118 includes only the compressed code B 117.

As a hardware configuration for realizing the image compression apparatus in FIG. 1, a general-purpose computer such as a personal computer can be used. The general-purpose computer includes, as a standard component, e.g., a central processing unit (CPU), a random access memory (RAM), a read only memory (ROM), a hard disk, an external storage device, a network interface, a display, a keyboard, and a mouse. That is, a computer program stored on a computer-readable storage medium causes a computer to function as processing units in FIG. 1 that execute processing in the flowcharts described below. An image decompression apparatus that decompresses the generated compressed data can be realized with the similar hardware configuration. The image compression apparatus and the image decompression apparatus may also be realized as dedicated hardware realized as an expansion card to the general-purpose computer.

The present invention is not limited to the configuration using the general-purpose computer. An image processing apparatus (multifunction peripheral (MFP)), a color scanner, or a color facsimile apparatus, which have a network communication function, can be used.

Figure 2:
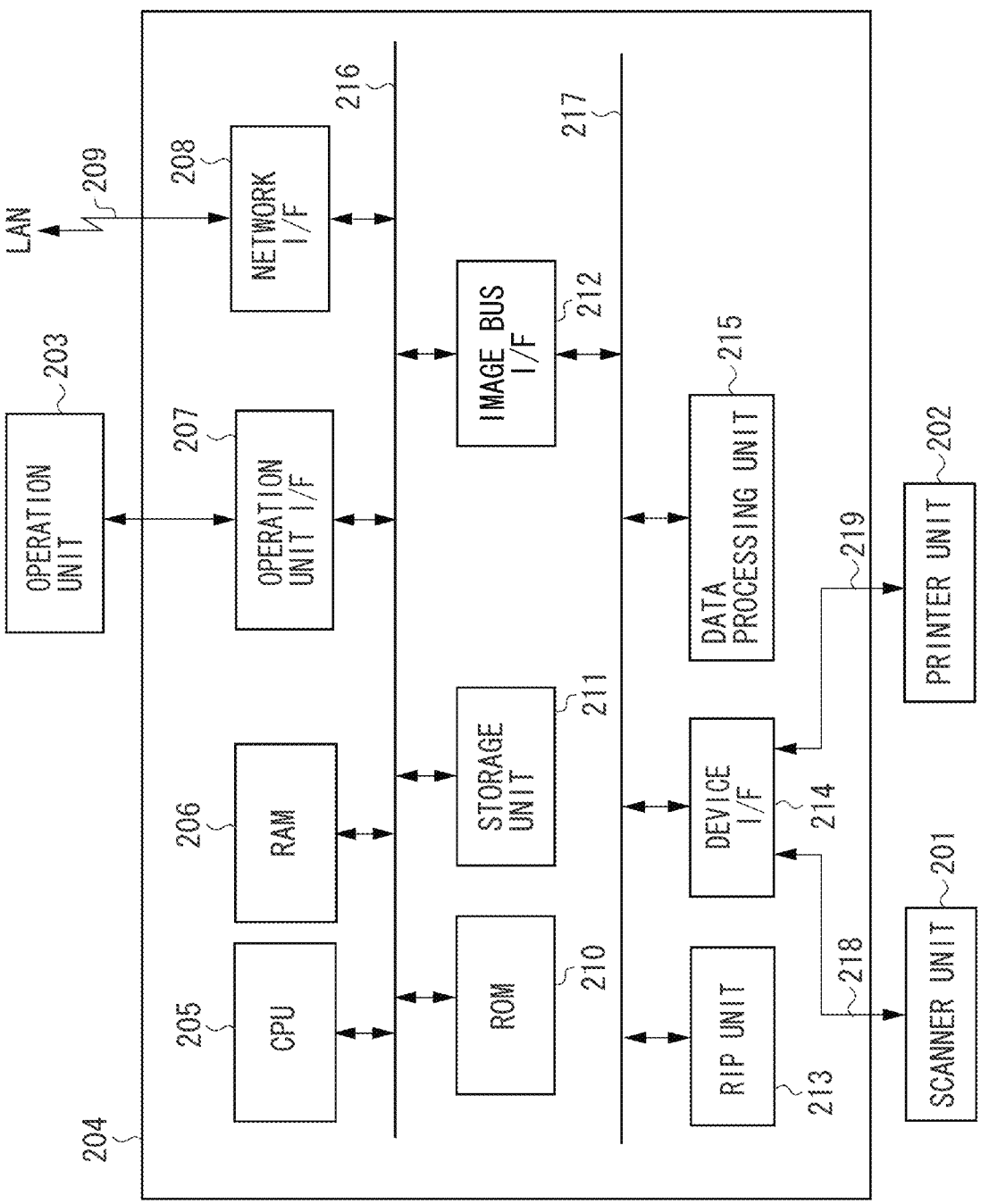
FIG. 2 illustrates a configuration of an image processing apparatus (or multifunction peripheral (MFP)) in detail according to the first exemplary embodiment.

The image processing apparatus (MFP) is described as an example of an apparatus having the image compression apparatus (and an image decompression apparatus) according to the present exemplary embodiment. FIG. 2 illustrates a configuration of the image processing apparatus (MFP) in detail. The MFP includes a scanner unit 201 as an image input device, a printer unit 202 as an image output device, a control unit 204, and an operation unit 203 as a user interface. The control unit 204 is connected to the scanner unit 201, the printer unit 202, and the operation unit 203. Further, the control unit 204 is connected to a local area network (LAN) 209 to input and output image information or device information as a controller. A CPU 205 controls the entire system. A RAM 206 is a system work memory for the CPU 205 operation, and is also an image memory for temporarily storing image data. A ROM 210 is a boot ROM, and stores a program such as a boot program of the system. A storage unit 211 is a hard disk drive, and stores system control software and image data. An operation unit interface (I/F) 207 is an interface unit with the operation unit (user interface) 203, and outputs image data displayed on the operation unit 203 to the operation unit 203. Further, the operation unit I/F 207 has a function for transmitting information input from the operation unit 203 by the user of the image processing apparatus to the CPU 205. A network interface (I/F) 208 connects the image processing apparatus (MFP) to the LAN 209, and inputs and outputs information in a packet format. The devices above are arranged on a system bus 216. An image bus interface (I/F) 212 is a bus bridge that connects the system bus 216 to an image bus 217 for transferring image data at high speed and perform conversion to a data structure. The image bus 217 includes, e.g., a peripheral component interconnect (PCI) bus or Institute of Electrical and Electronics Engineers (IEEE) 1394. The following devices are arranged on the image bus 217. A raster image processor (RIP) 213 realizes rendering processing for analyzing a page description language (PDL) code and rasterizing the data to a bit map image with a designated resolution. A device I/F unit 214 connects the scanner unit 201 as an image input device via signal line 218 and the printer unit 202 as an image output device via signal line 219 to the control unit 204, and perform conversion to the image data in synchronous system/asynchronous system. The data processing unit 215 functions as the image compression apparatus in FIG. 1 (or an image decompression apparatus).

According to the present exemplary embodiment, the CPU 205 in FIG. 2 may read and execute a computer program stored in the ROM 210 or the RAM 206 to function as the data processing unit 215 (processing units in FIG. 1). The present invention is not limited to this, and the data processing unit 215 may be realized by hardware such as an electronic circuit.

Figure 3:
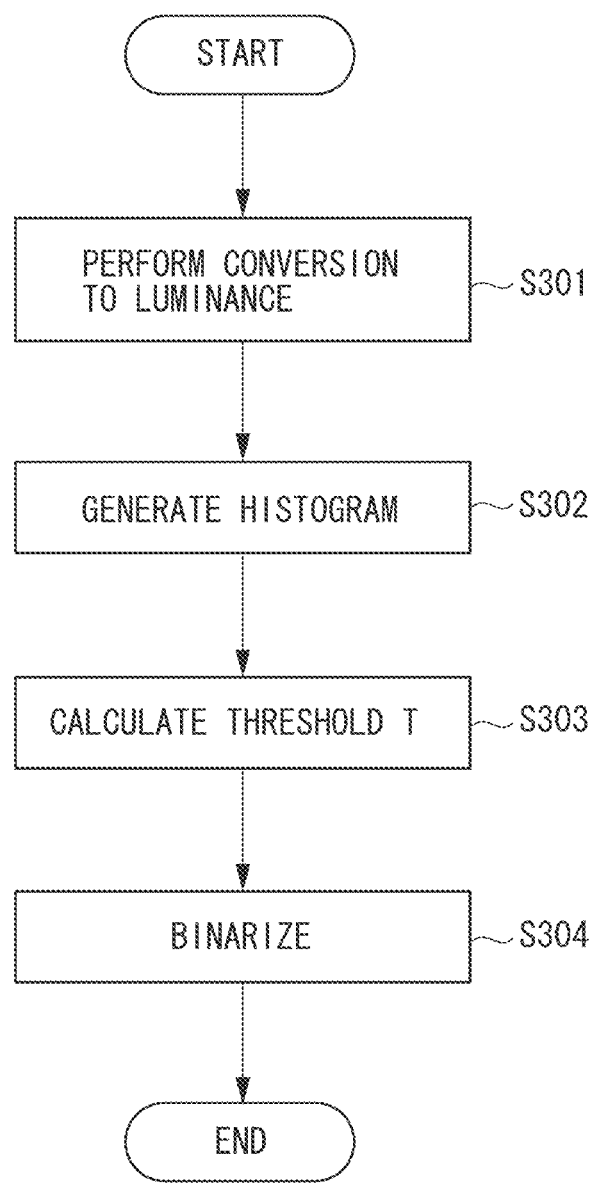
FIG. 3 illustrates a flowchart of binarization processing executed by a binarization unit according to the first exemplary embodiment.

The binarization processing executed by the binarization unit 102 is described with reference to FIGS. 3 and 7. FIG. 7 illustrates an example of an input image according to the present exemplary embodiment. FIG. 3 illustrates a flowchart of the binarization processing executed by the binarization unit 102 according to the present exemplary embodiment. Referring to FIG. 7, the input image 701 is a color multivalued image, a character of a region 702 is red, characters of regions 703 and 704 are black, and images of regions 705 and 706 contain a plurality of arbitrary colors. If the input image 701 is read by the scanner unit 201 in FIG. 2, the image 701 includes variation in reading or deterioration in JPEG compression. Obviously, an image not having any deterioration is included in the present exemplary embodiment. As an example, a description is given of a case where an image obtained by reading a paper document with the scanner unit 201 is to be the input image 101 (300 dpi/24-bit RGB).

In step S301, the binarization unit 102 receives the input image 101 (RGB image), and generates a luminance image by performing conversion to luminance using the following conversion expression.

$$Y = 0.299 \times R + 0.587 \times G + 0.114 \times B$$

Figure 4:
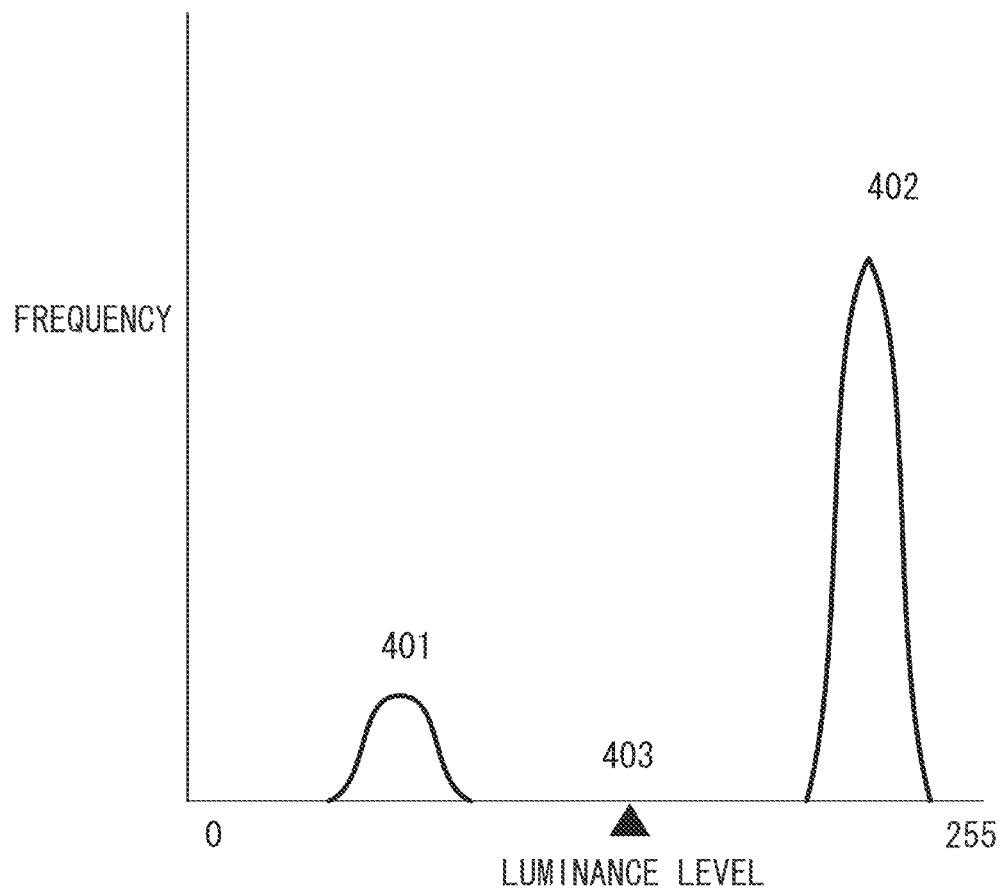
FIG. 4 illustrates an example of a histogram generated by the binarization unit according to the first exemplary embodiment.

In step S302, the binarization unit 102 generates the histogram of the whole surface of the luminance image generated in step S301. FIG. 4 illustrates an example of the histogram. Referring to FIG. 4, the abscissa indicates a luminance level of a Y signal, ranging 0 to 255, and the ordinate indicates an appearance frequency thereof. A distribution 401 indicates a character or an image, and a distribution 402 indicates a background base.

In step S303, the binarization unit 102 calculates a most appropriate binarization threshold T. However, a calculation method of the binarization threshold T is not limited. Referring to FIG. 4, an intermediate point 403 between the luminance levels of apexes of the distributions 401 and 402 is set as the binarization threshold T.

In step S304, the binarization unit 102 binarizes the luminance image based on the binarization threshold T, and generates a binary image. With the following processing, the binary image 103 in FIG. 1 is generated. A binary image 707 in FIG. 7 is obtained by binarizing the input image 701 as the multivalued image in FIG. 7.

Processing executed by the region specifying unit A 104 is described. The region specifying unit A 104 receives the binary image 103, and traces a contour line by referring to the black pixel. The region specifying unit A 104 further traces the traced contour line and specifies the character region and the position and size thereof from a region in the contour line based on a tracing result. A region other than the character region is specified as the background region, and the background region includes the photo region (or natural image region).

With the above processing, the positions and sizes of the character region and the photo region, and attribute information indicating the type of region are specified. In an example of the binary image 707 in FIG. 7, character regions 708 to 710 are specified, and photo regions 711 and 712 are also specified. The background region is the region other than the character region, containing the photo region.

Processing executed by the region specifying unit B 105 is described. The region specifying unit B 105 sequentially performs processing of the character region specified by the region specifying unit A 104. Specifically, a set of pixels having a predetermined value (black pixel) of the binary image to the character regions is set as a unit character, and the position of the unit-character region is thus specified.

The region information (positions and sizes) in the character region and the unit-character region specified by the region specifying units A 104 and B 105 is stored as the character region coordinate 106 on the RAM 206 in FIG. 2.

Processing executed by the first reduction unit 113 is described. The first reduction unit 113 receives the multivalued image 112 and reduces data to generate the reduced multivalued image 114. The generated reduced multivalued image 114 is temporarily stored on the RAM 206. According to the present exemplary embodiment, the reduction indicates a resolution conversion to a lower resolution and, e.g., the resolution conversion is executed by a bicubic interpolation method. The reduction ratio of the reduction unit 113 is determined according to the memory capacity of the RAM 206 available for storing the reduced multivalued image 114.

FIG. 6 illustrates a relation between the memory capacity of the RAM 206 available for storing the reduced multivalued image 114 and the reduction ratio of the first reduction unit 113. The multivalued image 112 is 300 dpi/24-bit RGB (24 M bytes).

If the memory capacity of the RAM 206 available for storing the reduced multivalued image 114 is 24 M bytes or more, the multivalued image 112 can be stored without the reduction by the reduction unit 113. In this case, the reduction ratio is 100% (reduction is not performed).

If the memory capacity of the RAM 206 available for storing the reduced multivalued image 114 is 6 M bytes or more and less than 24 M bytes, the reduction ratio is 50%. If the reduction ratio is 50%, a necessary memory capacity can be reduced to one quarter of that (24 M bytes) of the multivalued image 112 before the reduction. Therefore, the memory necessary to store the reduced multivalued image 114 is to be 6 M bytes.

For a brief description with reference to FIG. 6, the available memory capacity of the RAM 206 includes two ranges of 24 M bytes or more, and 6 M bytes or more and less than 24 M bytes. However, the present invention is not limited to this. If the available memory capacity of the RAM 206 is 14 M bytes or more, the reduction ratio may be 75%.

If the reduction ratio of the first reduction unit 113 is extremely low (e.g., 12.5%), a problem is caused that the character-specific representative color 111 cannot be properly extracted when a representative color extraction unit 110 refers to color information about the reduced multivalued image 114. Therefore, according to the present exemplary embodiment, it is assumed that the memory capacity is 6 M bytes or more and the minimum reduction ratio of the first reduction unit 113 is 50%.

According to the present exemplary embodiment, the reduced multivalued image 114 is stored on the RAM 206 without performing compression. However, the reduced multivalued image 114 may be stored after performing compression.

The first reduction unit 113 determines the reduction ratio based on the memory capacity of the RAM 206 available for storing the reduced multivalued image 114, and generates the reduced multivalued image 114.

Processing executed by the representative color extraction unit 110 is described. The representative color extraction unit 110 refers to the character region coordinate 106 and extracts the character-specific representative color 111 of the unit-character region in the character region with a positional correspondence between the black pixel portion of the partial binary image 107 and the reduced multivalued image 114. The partial binary image 107 is an image (binary image of the character region) obtained by clipping the character region of the binary image 103 based on the character region coordinate 106, and is stored on the RAM 206. As mentioned above, the character-specific representative color 111 is extracted in the unit-character regions.

Processing executed by the character region filling unit 115 is described. The character region filling unit 115 receives the character region coordinate 106, the partial binary image 107, and the reduced multivalued image 114. An average value of the background colors in the character region is calculated by referring to a color of the reduced multivalued image 114 positionally corresponding to a white pixel of the partial binary image 107. Subsequently the calculated average value of the background colors is assigned to the character region of the reduced multivalued image 114. In other words, a pixel value of the character region of the reduced multivalued image 114 or a pixel value of the unit-character region in the character region is replaced with the calculated background color (filling processing for filling a character pixel in the reduced multivalued image 114 with the background color), thereby generating a filled and reduced multivalued image. Thus, a subsequent compression ratio of the JPEG compression unit 116 is improved.

Processing executed by the second reduction unit 119 is described. The second reduction unit 119 receives an image filled by the character region filling unit 115, determines the reduction ratio based on the resolution of the background set by a user (hereinafter, referred to as the user) who uses the image compression apparatus and the reduction ratio of the first reduction unit 113, and perform a reduction. The reduction ratio (%) of the second reduction unit 119 is obtained by the following calculation expression.

The reduction ratio (%) of the second reduction unit={set resolution of the background/(resolution of the multivalued image×reduction ratio (%) of the first reduction unit/100)}×100

FIG. 5A illustrates an example of a screen for setting the resolution displayed on the operation unit 203 according to the present exemplary embodiment. The user selects one of 150 dpi, 100 dpi, 50 dpi, and 25 dpi, as the resolution of background, on the setting screen. The resolution of the background indicates the resolution of the image reduced by the second reduction unit 119.

FIG. 10 illustrates a relation between the resolution of the background set by the user, the reduction ratio of the first reduction unit 113, and the reduction ratio of the second reduction unit 119. The multivalued image 112 is 300 dpi/24-bit RGB (24 M bytes). The reduction ratio of the first reduction unit 113 is determined according to the memory capacity of the RAM 206 available for storing the reduced multivalued image 114, as mentioned above.

If the user sets the resolution of the background to 150 dpi and the reduction ratio of the first reduction unit 113 is 100%, the resolution of the reduced multivalued image 114 is 300 dpi. Then, the reduction ratio of the second reduction unit 119 is determined to 50% (150÷300×100=50%).

If the user sets the resolution of the background to 25 dpi and the reduction ratio of the first reduction unit 113 is 50%, the resolution of the reduced multivalued image 114 is 150 dpi. Thus, the reduction ratio of the second reduction unit 119 is determined to 17% (25÷150×100≈17%).

The second reduction unit 119 determines the reduction ratio based on the resolution of the background set by the user and the reduction ratio of the first reduction unit 113, and reduces the image, as mentioned above.

Figure 12:
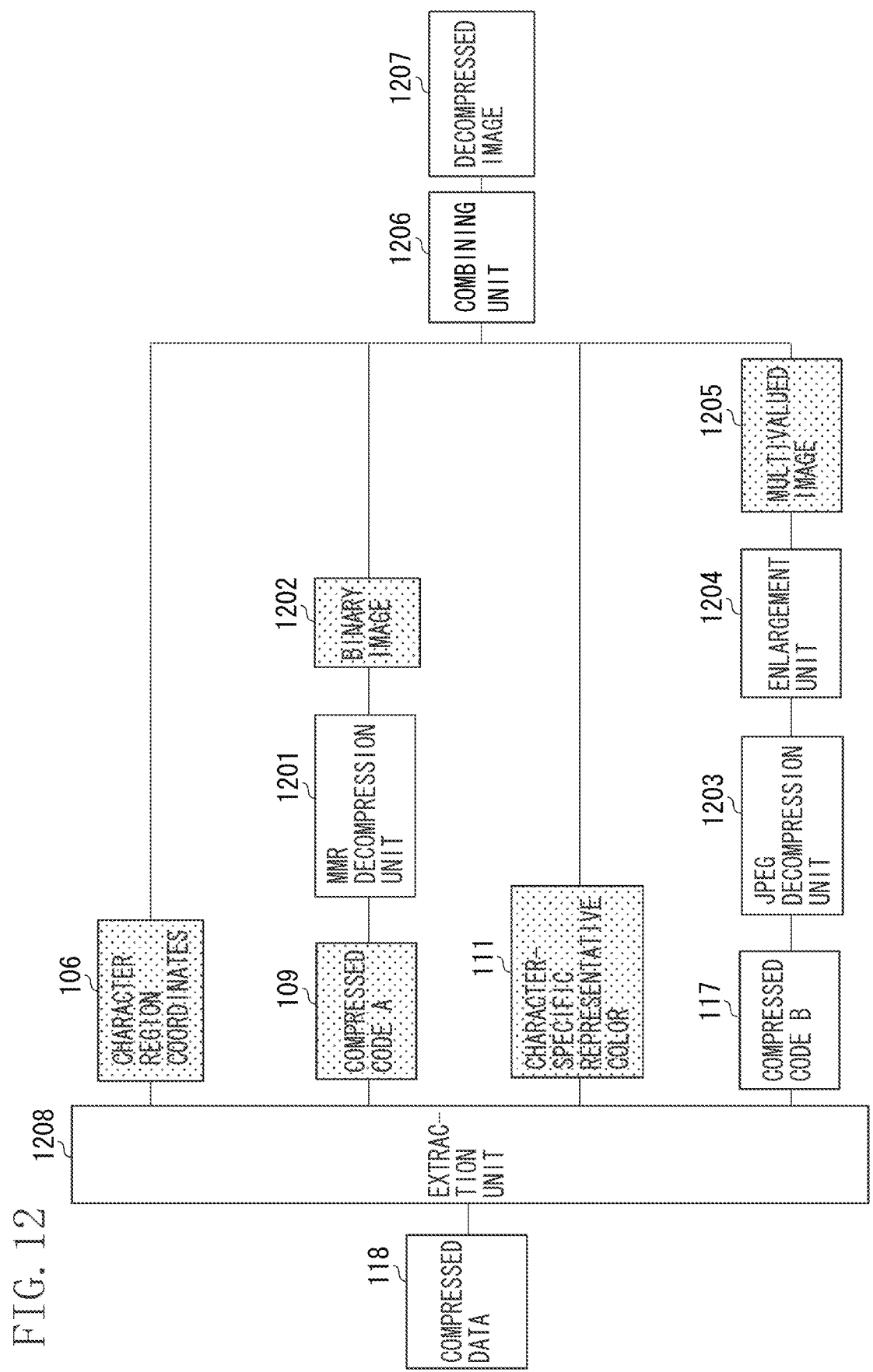
FIG. 12 illustrates a schematic configuration of an image decompression apparatus according to the first exemplary embodiment.

The image decompression apparatus that decompresses the compressed data 118 generated by the image compression apparatus is described with reference to FIG. 12. FIG. 12 illustrates a schematic configuration of the image decompression apparatus according to the present exemplary embodiment.

An extraction unit 1208 extracts the character region coordinate 106, the compressed code A 109, the compressed code B 117, and the character-specific representative color 111 from the compressed data 118. An MMR decompression unit 1201 performs MMR decompression processing of the compressed code A 109, and generates a binary image 1202. A JPEG decompression unit 1203 performs JPEG decompression processing of the compressed code B 117. Further, an enlargement unit 1204 performs enlargement processing to be the original resolution, thereby generating a multivalued image 1205. A combining unit 1206 refers to the character region coordinate 106 to assign the character-specific representative color 111 to the black pixels of the corresponding unit-character region in the binary image 1202, and displays the binary image on the multivalued image 1205. In this case, a white pixel of the binary image 1202 is treated as a transparent pixel, thereby passing through the multivalued image 1205. The image decompression apparatus in FIG. 12 decompresses the compressed data 118 generated by the image compression apparatus in FIG. 1, and generates a decompressed image 1207 as a final restored image.

Figure 8:
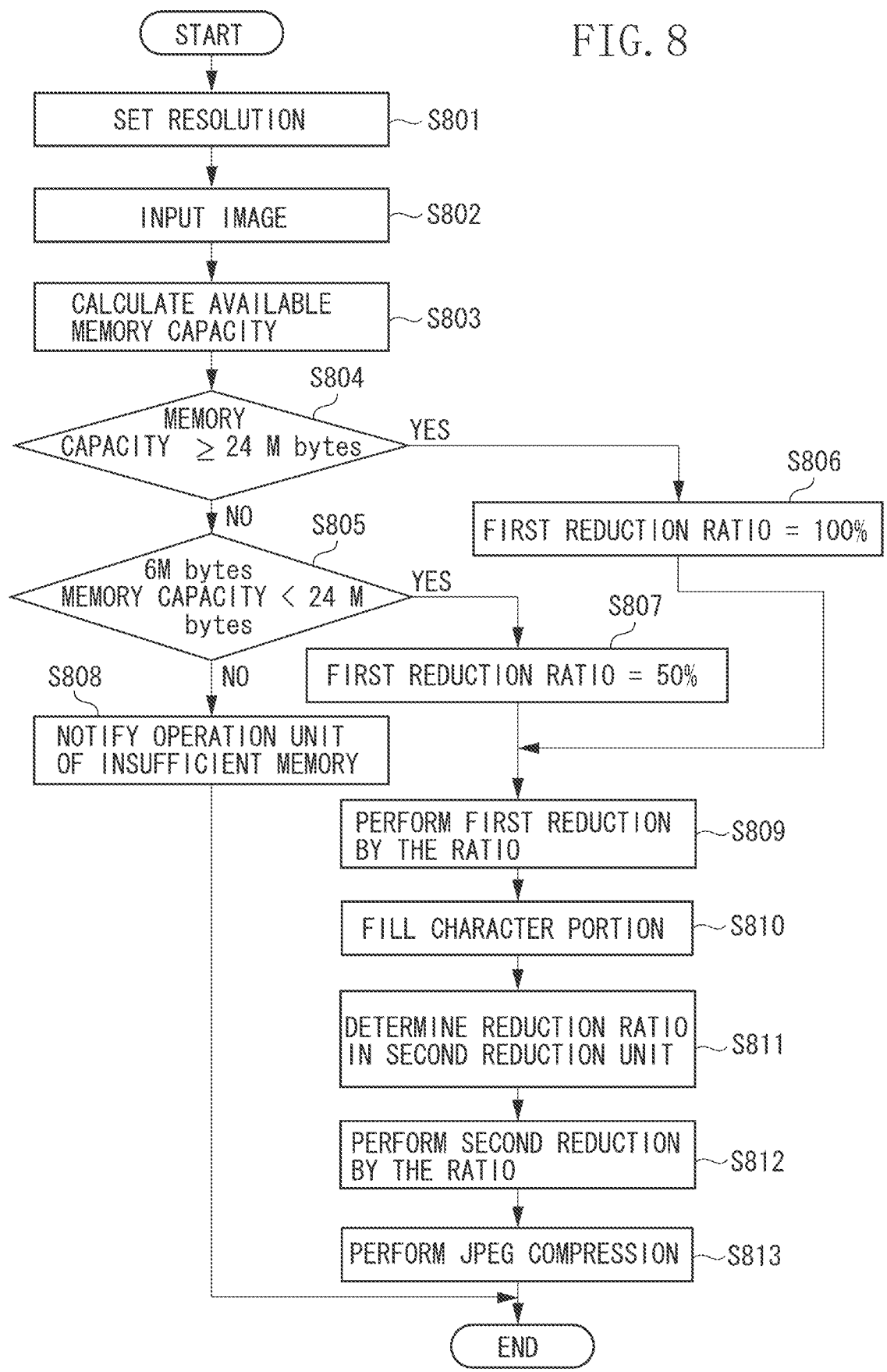
FIG. 8 illustrates a flowchart according to the first exemplary embodiment.

FIG. 8 illustrates a flowchart of processing for reducing the input image 101 by the first reduction unit 113 and the second reduction unit 119, and compressing the reduced image by the JPEG compression unit 116.

In step S801, the operation unit 203 that receives the selection of the resolution of the background from the user transmits information (resolution information) about the received resolution of the background to the data processing unit 215. The information about the set resolution of the background is transmitted to the second reduction unit 119 in the data processing unit 215.

In step S802, the scanner unit 201 reads a paper document, and generates the input image 101. In step S803, the CPU 205 calculates an available memory capacity of the RAM 206.

In step S804, the first reduction unit 113 determines whether the available memory capacity calculated in step S803 is 24 M bytes or more. If the first reduction unit 113 determines that the available memory capacity is 24 M bytes or more (YES in step S804), the processing proceeds to step S806. In step S806, the reduction ratio is set to 100%. If the first reduction unit 113 determines that the available memory capacity is less than 24 M bytes (NO in step S804), the processing proceeds to step S805. In step S805, the first reduction unit 113 determines whether the available memory capacity calculated in step S803 is 6 M bytes or more. If the first reduction unit 113 determines that the available memory capacity calculated in step S803 is 6 M bytes or more (YES in step S805), then in step S807, the reduction ratio is set to 50%. If the first reduction unit 113 determines that the available memory capacity is less than 6 M bytes (NO in step S805), the processing proceeds to step S808. In step S808, the first reduction unit 113 notifies the operation unit 203 of the insufficient memory capacity. Then, the processing ends.

In step S809, the first reduction unit 113 reduces the multivalued image 112 by using the reduction ratio set in step S806 or S807, and generates the reduced multivalued image 114. The generated reduced multivalued image 114 is temporarily stored on the RAM 206. The reduced multivalued image 114 is used for extracting a representative color by the representative color extraction unit 110.

In step S810, the character region filling unit 115 performs the filling processing (replacement processing for a pixel value of a character pixel) by using the reduced multivalued image 114 reduced in step S809, the character region coordinate 106, and the partial binary image 107. The character region filling unit 115 calculates an average value of the background colors in the character region by referring to a color of the reduced multivalued image 114 positionally corresponding to a white pixel of the partial binary image 107. The calculated average value of the background colors is assigned to the character region of the reduced multivalued image 114. In other words, the character region of the reduced multivalued image 114 or the unit-character region in the character region is filled with the calculated background color.

In step S811, the second reduction unit 119 determines the reduction ratio based on the resolution of the background set by the user and the reduction ratio of the first reduction unit 113.

In step S812, the second reduction unit 119 performs reduction processing of the reduced multivalued image, which has undergone the filling processing in step S810, by the reduction ratio determined in step S811.

In step S813, the JPEG compression unit 116 performs the JPEG compression of the image, which has undergone the reduction processing in step S812, and generates the compressed code B 117.

According to the present exemplary embodiment, the first reduction unit 113 reduces the multivalued image based on the available memory capacity of the RAM 206, and extracts the representative color by using the reduced multivalued image. Then, the filling processing of the character region is performed. Further, the second reduction unit 119 determines the reduction ratio based on the resolution of the background set by the user and the reduction ratio of the first reduction unit 113, and then further reduces the filling-processed reduced multivalued image. Therefore, the representative color extraction unit 110 can properly extract the character-specific representative color 111, while reducing the file size greatly as compared with the conventional technique. This can also be realized by an image compression apparatus which cannot employ a large-capacity memory.

According to the present exemplary embodiment, in step S803 in FIG. 8, the available memory capacity is calculated after the image input, as mentioned above. Alternatively, the available memory capacity may be calculated before the image input, or may be predetermined for each image processing apparatus (MFP).

The second reduction unit 119 according to the first exemplary embodiment determines the reduction ratio based on the resolution of the background set by the user and the reduction ratio of the first reduction unit 113, and reduces the image. According to a second exemplary embodiment of the present invention, the user does not directly set the resolution of the background, but the user sets the image quality and the file size on the setting screen displayed on the operation unit 203 as illustrated in FIG. 5B. As a consequence, the user can generate data according to a purpose without considering the information about the resolution of the background.

FIG. 5B illustrates an example of the setting screen displayed on the operation unit 203. The user selects one of "highest image quality", "image quality priority", "size priority", and "auto" as the image quality and the file size on the setting screen.

Figure 9:
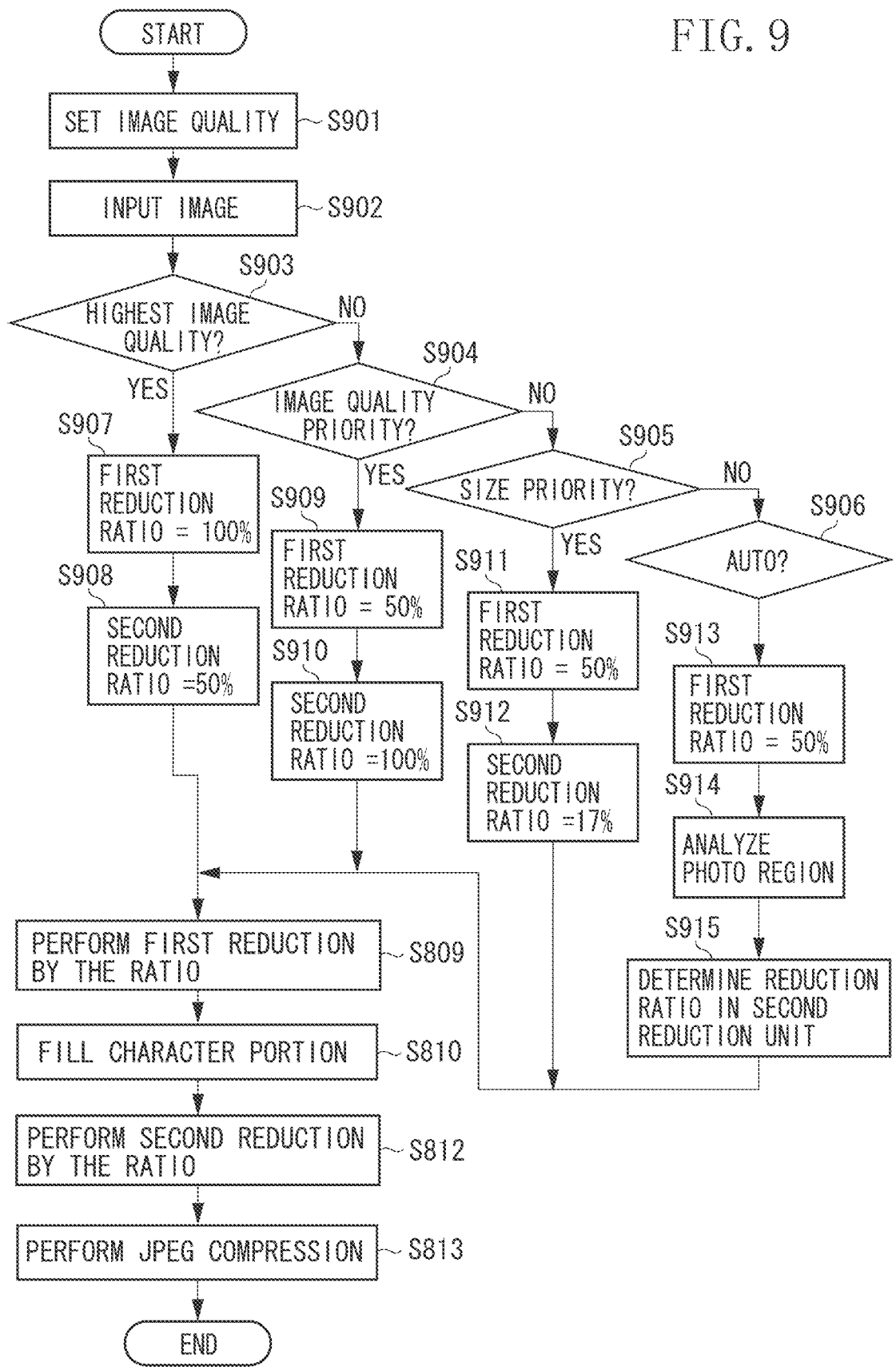
FIG. 9 illustrates a flowchart according to the second exemplary embodiment.

FIG. 9 illustrates a flow of processing including the reduction of the input image 101 (300 dpi) by the first reduction unit 113 and the second reduction unit 119 based on contents set on the setting screen, and the compression of the image by the JPEG compression unit 116. If the processing in FIG. 9 is similar to that in FIG. 8 according to the first exemplary embodiment, the same step number as that in FIG. 8 is used.

In step S901, the operation unit 203 that receives the selection in FIG. 5B from the user transmits the reception, i.e., the information about which one of "highest image quality", "image quality priority", "size priority", and "auto" is selected, to the data processing unit 215. The data processing unit 215 that receives the selection transmits the selected information to the first reduction unit 113 and the second reduction unit 119, to set the reduction ratio of the first reduction unit 113 and the reduction ratio of the second reduction unit 119. In step S902, the scanner unit 201 reads the paper document, and generates the input image 101.

In steps S903 to 906, the first reduction unit 113 and the second reduction unit 119 determine the contents selected in step S901, and set the reduction ratios corresponding to the selected contents.

When the "highest image quality" is selected, in step S907, the first reduction unit 113 sets the first reduction ratio to 100%. In step S908, the second reduction unit 119 sets the second reduction ratio to 50%. With the setting, the representative color is extracted by using the reduced multivalued image 114 (300 dpi). Thus, the most appropriate color is extracted as the character-specific representative color 111. The reduced multivalued image 114 after the filling processing is reduced to the image with 150 dpi.

When the "image quality priority" is selected, in step S909, the first reduction unit 113 sets the first reduction ratio to 50%. In step S910, the second reduction unit 119 sets the second reduction ratio to 100%. With the setting, the character-specific representative color 111 is extracted by using the reduced multivalued image 114 (150 dpi). The reduced multivalued image 114 after the filling processing is reduced to the image with 150 dpi.

When the "size priority" is selected, in step S911, the first reduction unit 113 sets the first reduction ratio to 50%. In step S912, the second reduction unit 119 sets the second reduction ratio to 17%. With the setting, the character-specific representative color 111 is extracted by using the reduced multivalued image 114 (150 dpi). The reduced multivalued image 114 after the filling processing is reduced to the image with 25 dpi, and the file size is thus reduced.

When the "auto" is selected, in step S913, the first reduction unit 113 sets the first reduction ratio to 50%. In step S914, the first reduction unit 113 calculates the proportion of the photo region in the input image 101. The photo region includes a natural image, an illustration, and a drawing. Thus, the photo region indicates a region other than the character region and the background base region. The proportion of the photo region corresponds to an area proportion of regions 705 and 706 to the input image 701 in FIG. 7 as an example.

In step S915, the second reduction unit 119 determines the reduction ratio based on the proportion of the photo region calculated in step S914. If the proportion of the photo region is large, the second reduction unit 119 reduces the reduction ratio. On the other hand, if the proportion of the photo region is small, the second reduction unit 119 increases the reduction ratio. This is because, if the proportion of the photo region is small and the reduction ratio is small, the photo visibility deteriorates, and thus, it becomes difficult to determine what the photo is like. FIG. 11 illustrates a relation between the proportion of the photo region and the reduction ratio of the second reduction unit 119. If the proportion of the photo region is 0%, the input image 701 does not include the photo region and the reduction ratio is therefore set to 17%. If the proportion of the photo region ranges from 1% to 20%, which is small, contents of the photo region cannot be recognized when the reduction ratio is too small. Therefore, the reduction ratio is set to 100% in this case. If the proportion of the photo region ranges from 80% to 100%, which indicates that a large photograph is used, contents thereof can be recognized to some degree even after the certain level of reduction. Therefore, the reduction ratio is set to 17%.

According to the present exemplary embodiment, the proportion of the photo region in the input image is calculated, and the reduction ratio is determined. If the input image contains a plurality of photo regions, the reduction ratio may be determined based on the size of the individual photo region.

Steps S809, 810, 812, and 813 in FIG. 9 are similar to those in the processing in FIG. 8 according to the first exemplary embodiment, and a description thereof is thus omitted.

According to the present exemplary embodiment, the user can generate data according to the purpose without considering the information about the resolution of the background.

According to the first and second exemplary embodiments, it is described that the resolution is set or the selection of the image quality setting is received before the image input. Alternatively, the input image may be previewed on the screen of the operation unit 203 after the image input, and the user may perform the selection by viewing the previewed contents. As a consequence, when simultaneously inputting a plurality of paper documents with an auto document feeder (ADF), the selection can be individually performed for each document.

According to the first and second exemplary embodiments, the reduction of the first reduction unit 113 and the second reduction unit 119, i.e., the resolution conversion to a lower resolution uses the resolution conversion by the bicubic interpolation method as mentioned above. However, the present invention is not limited to this, and the resolution conversion may be executed with a bilinear method or a thinning-out method. Alternatively, the resolution conversion method may be switched between the first reduction unit 113 and the second reduction unit 119. For example, the first reduction unit 113 performs the resolution conversion using the bicubic interpolation method, and the second reduction unit 119 executes the resolution conversion using the thinning-out method. The first reduction unit 113 performs the resolution conversion using the bicubic interpolation method, and the lack of color information can be therefore suppressed as compared with the resolution conversion using the thinning-out method. As a consequence, the character-specific representative color 111 can be properly extracted. The second reduction unit 119 performs the resolution conversion using the thinning-out method, and the processing can be executed at higher speed when realizing the second reduction unit 119 by software, as compared with the resolution conversion using the bicubic interpolation method. When realizing the second reduction unit 119 by hardware, the processing is executed with lower costs, as compared with the resolution conversion using the bicubic interpolation method.

According to the first exemplary embodiment, if the available memory capacity is less than 6 M bytes, the shortage of memory capacity is notified and the processing ends. However, the present invention is not limited to this. For example, a possibility that the accuracy of a representative color (character color) deteriorates because of the insufficient memory capacity may be notified and the processing in steps S809 to S813 may be performed to generate the compressed data. If the available memory capacity of the RAM 206 is less than 6 M bytes, the reduction ratio needs to be less than 50%. In this case, within a range in which the reduction ratio is not to be too small (e.g., 12.5%), the reduction ratio may be dynamically determined.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-272157 filed Dec. 13, 2011, which is hereby incorporated by reference herein in its entirety.

What is claimed is:

1. An image processing apparatus, comprising:
   (a) a reception unit configured to receive an input related to a first resolution from a user;
   (b) an input unit configured to input an image;
   (c) a first reduction unit configured to reduce a resolution of the image to a second resolution;
   (d) a change unit configured to change colors of a character region in the image whose resolution has been reduced to the second resolution by the first reduction unit, wherein the colors of the character region are changed using colors of another region;
   (e) a determining unit configured to determine a reduction rate based on the first resolution and the second resolution;
   (f) a second reduction unit configured to reduce a resolution of the image in which the colors of the character region have been changed, wherein the resolution of the image is reduced at the determined reduction; and
   (g) a compression unit configured to compress the image whose resolution has been reduced by the second reduction unit.

2. The image processing apparatus according to claim 1, wherein the reduction of the resolution of the image means reduction of the size of an image file associated with the image.

3. The image processing apparatus according to claim 1, further comprising:
   a binarization unit configured to binarize the input image such that a pixel darker than a threshold value is converted to a black pixel and a pixel lighter than the threshold value is converted to a white pixel;
   a trace unit configured to trace a contour line on a binary image obtained by the binarization unit; and
   a specifying unit configured to specify the character region based on a traced result obtained by the trace unit.

4. The image processing apparatus according to claim 3, wherein the change unit determines a background color by referring to colors of pixels in the image whose resolution has been reduced to the second resolution by the first reduction unit, the colors corresponding to positions of white pixels around the specified character region in the binary image, and changes the colors of the character region by assigning the determined background color to the character region of the image whose resolution has been reduced to the second resolution by the first reduction unit.

5. The image processing apparatus according to claim 1, wherein the first reduction unit determines a resolution reduction ratio according to a memory capacity available for storing the image whose resolution has been reduced to the second resolution by the first reduction unit, and reduces the resolution of the input image according to the determined resolution reduction ratio.

6. The image processing apparatus according to claim 1, wherein the determining unit is configured to determine the reduction rate by dividing the first resolution by the second resolution.

7. A method for image processing, comprising:
   receiving an input related to a first resolution from a user;
   receiving an image;
   reducing, by a first reduction unit, a resolution of the image to a second resolution;
   changing, by a change unit, colors of a character region in the image whose resolution has been reduced to the second resolution by the first reduction unit, wherein the colors of the character region are changed using colors of another region;
   determining a reduction rate based on the resolution related to the received input, and the second resolution;
   by a second reduction unit, reducing a resolution of the image in which the colors of the character region have been changed, wherein the resolution of the image is reduced at the determined reduction rate; and
   compressing the image whose resolution has been reduced by the second reduction unit.

8. The method for image processing according to claim 7, wherein the reduction of the resolution of the image means reduction of the image in size.

9. The method for image processing according to claim 7, further comprising:
   binarizing, by a binarization unit, the received image such that a pixel darker than a threshold value is converted to a black pixel and a pixel lighter than the threshold value is converted to a white pixel;
   tracing, by a trace unit, a contour line on a binary image obtained by the binarization unit; and
   specifying the character region based on a traced result obtained by the trace unit.

10. The method for image processing according to claim 9, wherein the change unit determines a background color by referring to colors of pixels in the image whose resolution has been reduced to the second resolution by the first reduction unit, corresponding to positions of white pixels around the specified character region in the binary image, and changes the colors of the character region by assigning the determined background colors to the character region of the image whose resolution has been reduced to the second resolution by the first reduction unit.

11. The method for image processing according to claim 7, wherein the first reduction unit determines a resolution reduction ratio according to a memory capacity available for storing the image whose resolution has been reduced to the second resolution by the first reduction unit, and reduces the resolution of the received image according to the determined resolution reduction ratio.

12. The method for image processing according to claim 7, wherein the the reduction rate is determined by dividing the first resolution by the second resolution.

13. A non-transitory computer-readable storage medium configured to perform image processing, the image processing comprising:

receiving an input related to a first resolution from a user;

receiving an image;

reducing, by a first reduction unit, a resolution of the image to a second resolution;

changing, by a change unit, colors of a character region in the image whose resolution has been reduced to the second resolution by the first reduction unit, wherein the colors of the character region are changed using colors of another region;

determining a reduction rate based on the resolution related to the received input, and the second resolution;

by a second reduction unit, reducing a resolution of the image in which the colors of the character region have been changed, wherein the resolution of the image is reduced at the determined reduction rate; and compressing the image whose resolution has been reduced by the second reduction unit.

14. The non-transitory computer-readable storage medium according to claim 13, wherein the reduction of the resolution of the image means reduction of the image in size.

15. The non-transitory computer-readable storage medium according to claim 13, wherein the image processing further comprises:

binarizing, by a binarization unit, the received image such that a pixel darker than a threshold value is converted to a black pixel and a pixel lighter than the threshold value is converted to a white pixel;

tracing, by a trace unit, a contour line on a binary image obtained by the binarization unit; and specifying the character region based on a traced result obtained by the trace unit.

16. The non-transitory computer-readable storage medium according to claim 15, wherein the change unit determines a background color by referring to colors of pixels in the image whose resolution has been reduced to the second resolution by the first reduction unit, corresponding to positions of white pixels around the specified character region in the binary image, and changes the colors of the character region by assigning the determined background colors to the character region of the image whose resolution has been reduced to the second resolution by the first reduction unit.

17. The non-transitory computer-readable storage medium according to claim 13, wherein the first reduction unit determines a resolution reduction ratio according to a memory capacity available for storing the image whose resolution has been reduced to the second resolution by the first reduction unit, and reduces the resolution of the received image according to the determined resolution reduction ratio.

18. The non-transitory computer-readable storage medium according to claim 13, wherein the reduction rate is determined by dividing the first resolution by the second resolution.

* * * * *